Patented June 9, 1942

2,286,041

UNITED STATES PATENT OFFICE 2,286,041

CELLULOSE ACETATE MOLDING COMPOSITION

Raphael L. Stern, South River, N. J., assignor to Hercules Powder Company, Wilmington, Del., a corporation of Delaware No Drawing. Application December 24, 1938, Serial No. 247,681

10 Claims. (Cl. 106—177).

This invention relates to an improved cellulose acetate plastic and to methods of production thereof. More particularly, it relates to a clear, transparent, substantially colorless cellulose acetate plastic and to methods of producing the same.

Cellulose acetate, as produced commercially, possesses an inherent yellow tone which is further increased on heating of the plastic compositions during or prior to molding. To utilize cellulose acetate for the production of plastics having substantially no color, attempts have been made to neutralize the yellow tone by addition of a blue dyestuff. Satisfactory results have not been obtained and the resulting plastics have usually been of a brownish muddy tint. It is believed that blue dyestuffs in general are inherently unstable under the conditions of molding and undergo decomposition.

Now, I have found that the yellow tint of cellulose acetate may be neutralized with a blue dyestuff and the cellulose acetate and blue dyestuff stabilized against discoloration on heating in molding compositions, enabling me to produce clear, transparent and substantially colorless cellulose acetate plastics.

I have found that addition of an acid having a dissociation constant within the range of about $4 \times 10^{-2}$ to about $1 \times 10^{-4}$ to the cellulose acetate plastic containing the blue dyestuff retards the discoloration of the cellulose acetate on heating in the molding operation and also exerts a stabilizing influence on the blue dyestuff, preventing its decomposition during the molding of the plastic. Although the exact mechanism by which my acids stabilize the dyes is not known to me, the behavior appears to be general for dyestuffs of blue color, for example, blue dyes of the azine, diphenyl naphthyl methane, anthraquinone or triphenylmethane types.

My process is applicable to any cellulose acetate plastic composition containing a heat-stable plasticizer or mixture of heat-stable plasticizers, i. e., plasticizers which do not themselves discolor when heated with cellulose acetate under molding conditions. Plasticizers which have been found to be useful in preparing the cellulose acetate plastics are camphor, dimethyl phthalate, diethyl phthalate, diphenyl phthalate, ethyl phthalyl ethyl glycollate, tricresyl phosphate, tributyl phosphate, butyl tartrate, triacetin, ortho and para toluene sulfonamides, tripropionin, triethyl citrate, dimethoxy ethyl phthalate, methyl methoxy-ethyl phthalate, sorbitol hexa-acetate, light colored plasticizing resins, etc.

The cellulose acetate which I may utilize in carrying out my invention may be of any of the grades suitable for use in molding plastics. These grades usually have an acetyl content within the range of about 52 to about 55 per cent by weight.

The blue dyes which are suitable for tinting of cellulose acetate plastic compositions may be, for example, of the azine, diphenyl naphthyl methane, anthraquinone or triphenylmethane types. The amount of dye added is usually the amount necessary to neutralize the yellow tint. This amount varies with different dyestuffs due to the different tinctorial powers. Blue dyes which are satisfactory for this purpose are:

| | Type of dye | Soc. Dyers & Colorists England, 1924 ed., color index No. — |
|---|---|---|
| Phenoform Blue R | Triphenyl methane | Not given. |
| Wool Fast Blue BL | Azine | 833. |
| Victoria Blue B | Diphenyl mono naphthyl methane | 729. |
| Violet FA | Triphenyl methane | 681. |
| Blue GA | Anthraquinone | Not given. |

The acids which I have found to exert a stabilizing effect on the cellulose acetate and the blue dye to permit the production of plastic compositions having substantially no color or haze may be either inorganic or organic acids, and may be monobasic or polybasic in character. I have classified the acids which exert the desired effect as those acids whose dissociation constant falls within the range of about $4 \times 10^{-2}$ to about $1 \times 10^{-4}$. In the case of polybasic acids I classify on the basis of the dissociation constant of the first hydrogen ion. Acids which are particularly effective are phosphoric acid ($K_D$ $1.1 \times 10^{-2}$), tartaric acid ($K_D$ $1.1 \times 10^{-3}$), citric acid ($K_D$ $8 \times 10^{-4}$), oxalic acid ($K_D$ $3.8 \times 10^{-2}$) and lactic acid ($K_D$ $1.38 \times 10^{-4}$).

The stabilizing effect of the various acids utilizable in accordance with this invention appears to be related to the strength of the acid and the amount used. With the weaker acids the effect is obtained with a larger proportion of the acid. With tartaric acid, for example, best results are obtained when the tartaric acid is present in an amount within the range of about 0.005 to about 0.012 per cent by weight of the cellulose acetate. Above 0.05 per cent, by weight, of tartaric acid the color stabilizing effect is minimized. I have obtained the effect with other acids when used in amounts up to about 0.10 per cent, by weight, of the cellulose acetate. The effect has been obtained with as little as 0.0005 per cent, by weight, of acid based on the cellulose acetate.

I find it convenient to add the acid to a solution of a suitable blue dye which is, in turn, incorporated into the cellulose acetate plastic. Thus, for example, the acid may be added to a dye solution containing 0.5 gram of blue dye dissolved in a gallon of methyl alcohol. The amount of acid added will fall within the range disclosed above and will depend on the particular acid employed.

In carrying out the process of this invention, I may, for example, make a paste of cellulose acetate, plasticizer and solvent in a suitable mixer, roll it into sheets on heated rolls, add the blue dye solution containing the acid stabilizing agent thereto and finally remove most of the solvent by rolling. Further amounts of solvent may be removed by subsequently heating chips of the rolled sheets to an elevated temperature. The plastic composition in granular or powdered form may then be molded in a heated press or may be injection molded. The plastic composition may be used for the production of sheets, rods, tubes or any molded article.

As illustrative of the carrying out of the invention the following example is typical:

A paste was prepared in a chrome plated mixer according to the following formula:

| | |
|---|---|
| Cellulose acetate (53.1% acetyl, 36 sec. viscosity) | 10 lbs. |
| Methyl phthalyl ethyl glycollate | 3 lbs. 2 oz. |
| Triphenyl phosphate | 1 lb. 14 oz. |
| Camphor | 1 lb. 5 oz. |
| Acetone | 4 lbs. |
| Eethyl alcohol | 3 lbs. |

Two 7.5 lb. portions of the above mix were taken off and both rolled into sheets on chrome plated rolls. To portion A there was added on the rolls 8.6 cc. of a solution of 0.113 gram of Phenoform Blue R in one liter of methyl alcohol. To portion B there was added 8.6 cc. of a solution of 0.113 gram of Phenoform Blue R in one liter of methyl alcohol containing 8 grams of tartaric acid per liter of dye solution. Rolling was continued until the sheets contained about 10 per cent, by weight, of solvent. Both portions were then cut to granulations of about one-quarter inch size and dried in an oven to less than 2 per cent volatile content. The two portions were then injected into articles in a standard commercial injection molding machine at a cylinder temperature of about 400° F. The granulations prepared from portion A gave molded pieces having a brownish, muddy tint. The granulations from portion B, on the other hand, gave molded articles having a clear, blue-violet, glass-like tint.

The details set forth in the above description and typical example are for purposes of illustration only, and the invention as herein broadly described and claimed is in no way limited thereby.

Where, in the specification I refer to the acetyl content of cellulose acetate, I mean the acetyl value determined as acetic acid.

What I claim and desire to protect by Letters Patent is:

1. In the preparation of clear transparent substantially colorless plastic compositions comprising cellulose acetate, a heat-stable plasticizer, and a blue dyestuff, the improvement which consists in incorporating in the said composition 0.0005% to about 0.10% by weight based on the weight of the cellulose acetate of an acid having a dissociation constant within the range of about $4\times10^{-2}$ to about $1\times10^{-4}$, to prevent decomposition and discoloration of the dyestuff under the influence of heat required in molding the composition.

2. In the preparation of clear transparent substantially colorless plastic compositions comprising cellulose acetate, a heat-stable plasticizer and a blue dyestuff, the improvement which consists in incorporating in the said composition 0.0005% to about 0.10% by weight based on the weight of the cellulose acetate of phosphoric acid to prevent decomposition and discoloration of the dyestuff under the influence of heat required in molding the composition.

3. In the preparation of clear transparent substantially colorless plastic compositions comprising cellulose acetate, a heat-stable plasticizer and a blue dyestuff, the improvement which consists in incorporating in the said composition 0.0005% to about 0.10% by weight based on the weight of the cellulose acetate of tartaric acid to prevent decomposition and discoloration of the dyestuff under the influence of heat required in molding the composition.

4. In the preparation of clear transparent substantially colorless plastic compositions comprising cellulose acetate, a heat-stable plasticizer and a blue dyestuff, the improvement which consists in incorporating in the said composition 0.0005% to about 0.10% by weight based on the weight of the cellulose acetate of citric acid to prevent decomposition and discoloration of the dyestuff under the influence of heat required in molding the composition.

5. A clear transparent substantially colorless plastic composition comprising cellulose acetate, a heat-stable plasticizer therefor, a blue dyestuff tending to lose its blue color under the heat required to mold the composition, and 0.0005% to about 0.10% by weight based on the weight of the cellulose acetate of an acid having a dissociation constant within the range between about $4\times10^{-2}$ and about $1\times10^{-4}$, the acid serving to prevent decomposition and discoloration of the dye.

6. A clear transparent substantially colorless plastic composition comprising cellulose acetate, a heat-stable plasticizer therefor, a blue dyestuff tending to lose its blue color under the heat required to mold the composition, and 0.0005% to about 0.10% by weight based on the weight of the cellulose acetate of an inorganic acid having a dissociation constant within the range between about $4\times10^{-2}$ and about $1\times10^{-4}$, the acid serving to prevent decomposition and discoloration of the dye.

7. A clear transparent substantially colorless plastic composition comprising cellulose acetate, a heat-stable plasticizer therefor, a blue dyestuff tending to lose its blue color under the heat required to mold the composition, and 0.0005% to about 0.10% by weight based on the weight of the cellulose acetate of an organic acid having a dissociation constant within the range between about $4\times10^{-2}$ and about $1\times10^{-4}$, the acid serving to prevent decomposition and discoloration of the dye.

8. A clear transparent substantially colorless plastic composition comprising cellulose acetate, a heat-stable plasticizer therefor, a blue dyestuff tending to lose its blue color under the heat required to mold the composition, and 0.0005% to about 0.10% by weight based on the weight of the cellulose acetate of phosphoric acid, the acid serving to prevent decomposition and discoloration of the dye.

9. A clear aransparent substantially colorless plastic composition comprising cellulose acetate, a heat-stable plasticizer therefor, a blue dyestuff tending to lose its blue color under the heat required to mold the composition, and 0.0005% to about 0.10% by weight based on the weight of the cellulose acetate of tartaric acid, the acid serving to prevent decomposition and discoloration of the dye.

10. A clear tarnsparent substantially colorless plastic composition comprising cellulose acetate, a heat-stable plasticizer therefor, a blue dyestuff tending to lose its blue color under the heat required to mold the composition, and 0.0005% to about 0.10% by weight based on the weight of the cellulose acetate of citric acid, the acid serving to prevent decomposition and discoloration of the dye.

RAPHAEL L. STERN.